(12) United States Patent
Kojima

(10) Patent No.: US 11,681,478 B1
(45) Date of Patent: Jun. 20, 2023

(54) IMAGE FORMING DEVICE

(71) Applicant: TOSHIBA TEC KABUSHIKI KAISHA, Tokyo (JP)

(72) Inventor: Takahiro Kojima, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/690,042

(22) Filed: Mar. 9, 2022

(51) Int. Cl.
*G06F 3/12* (2006.01)

(52) U.S. Cl.
CPC ............ *G06F 3/121* (2013.01); *G06F 3/1234* (2013.01); *G06F 3/1273* (2013.01); *G06F 3/1285* (2013.01)

(58) Field of Classification Search
CPC combination set(s) only.
See application file for complete search history.

(56) References Cited

U.S. PATENT DOCUMENTS

| | | | |
|---|---|---|---|
| 2004/0091275 A1 | 5/2004 | Matsuda et al. | |
| 2011/0262157 A1* | 10/2011 | Ochiai | G03G 15/5037 399/49 |
| 2019/0278652 A1* | 9/2019 | Yamaguchi | H04N 1/00888 |
| 2020/0076965 A1* | 3/2020 | Kwon | H04N 1/32432 |
| 2020/0233747 A1* | 7/2020 | O'donncha | G06F 11/1438 |
| 2021/0354488 A1* | 11/2021 | Nakamura | B41J 29/13 |
| 2022/0050650 A1* | 2/2022 | Niimoto | B41J 2/17566 |
| 2022/0206821 A1* | 6/2022 | Devegowda | G06F 12/0238 |
| 2022/0247749 A1* | 8/2022 | Yada | H04L 63/101 |
| 2022/0247817 A1* | 8/2022 | Yada | H04L 67/1097 |
| 2022/0294917 A1* | 9/2022 | Yamasaki | H04N 1/00079 |
| 2022/0317949 A1* | 10/2022 | Morishita | G03G 15/2039 |
| 2022/0319805 A1* | 10/2022 | Fang | H01J 37/28 |

FOREIGN PATENT DOCUMENTS

| | | |
|---|---|---|
| JP | 2005-250374 | 9/2005 |
| JP | 2018-091966 | 6/2018 |

* cited by examiner

*Primary Examiner* — Helen Zong
(74) *Attorney, Agent, or Firm* — Amin, Turocy & Watson LLP

(57) ABSTRACT

According to one embodiment, an image forming device includes a memory and a processor. The memory is configured to store an execution history of image processing and an adjustment history of the image processing. The processor is configured to detect an occurrence of an event based on a correlation between the execution history and the adjustment history, and to execute instructing to output information according to a detection result.

16 Claims, 14 Drawing Sheets

FIG. 10

| COUNTER | | NUMBER OF COUNTS |
|---|---|---|
| POWER-ON | POWER-ON | 1 |
| POWER-OFF | POWER-OFF | 1 |
| PRINTING OPERATION COUNTER | ONE SHEET PRINTING (×8) | 8 |
| IMAGE QUALITY ADJUSTMENT CONTROL | CONTROL NORMALLY ENDED | 1 |
| COLOR REGISTRATION CONTROL | CONTROL NORMALLY ENDED | 1 |

FIG. 11

| COUNTER | | NUMBER OF COUNTS |
|---|---|---|
| POWER-ON | POWER-ON | 1 |
| POWER-OFF | POWER-OFF | 1 |
| PRINTING OPERATION COUNTER | ONE SHEET PRINTING (×8) | 8 |
| IMAGE QUALITY ADJUSTMENT CONTROL | CONTROL ABNORMALLY ENDED | 0 |
| COLOR REGISTRATION CONTROL | CONTROL ABNORMALLY ENDED | 0 |

IMAGE FORMING DEVICE

FIELD

Embodiments described herein relate to an image forming device and methods related thereto.

BACKGROUND

Failure detection of an image forming device is executed by detecting a signal from a sensor in the device, numerical data such as temperature, an operation signal of a motor, a synchronization signal, and the like at a predetermined timing. The image forming device detects a failure for each component and unit, and displays the failure on a control panel or stores failure information.

In a manufacturing process or the like of the image forming device, it is necessary to attach a sensor to all components or units or set a threshold value for a signal from the sensor.

DESCRIPTION OF THE DRAWINGS

FIG. 10 is a diagram illustrating an example of the number of counts and presence of correlations of an energization history, an execution history, and an adjustment history;

FIG. 11 is a diagram illustrating an example of the number of counts and absence of correlations;

DETAILED DESCRIPTION

In general, according to one embodiment, an image forming device includes a memory and a processor. The memory is configured to store an execution history of image processing and an adjustment history of the image processing. The processor is configured to detect an occurrence of an event based on a correlation between the execution history and the adjustment history, and to execute instructing to output information according to a detection result.

Hereinafter, image forming devices according to embodiments will be described with reference to the drawings. In the following drawings used for descriptions of the embodiments, a scale of each part is appropriately changed. In each of the following drawings used for the descriptions of the embodiments, configurations are omitted as appropriate for the purpose of description.

First Embodiment

Figure 1:
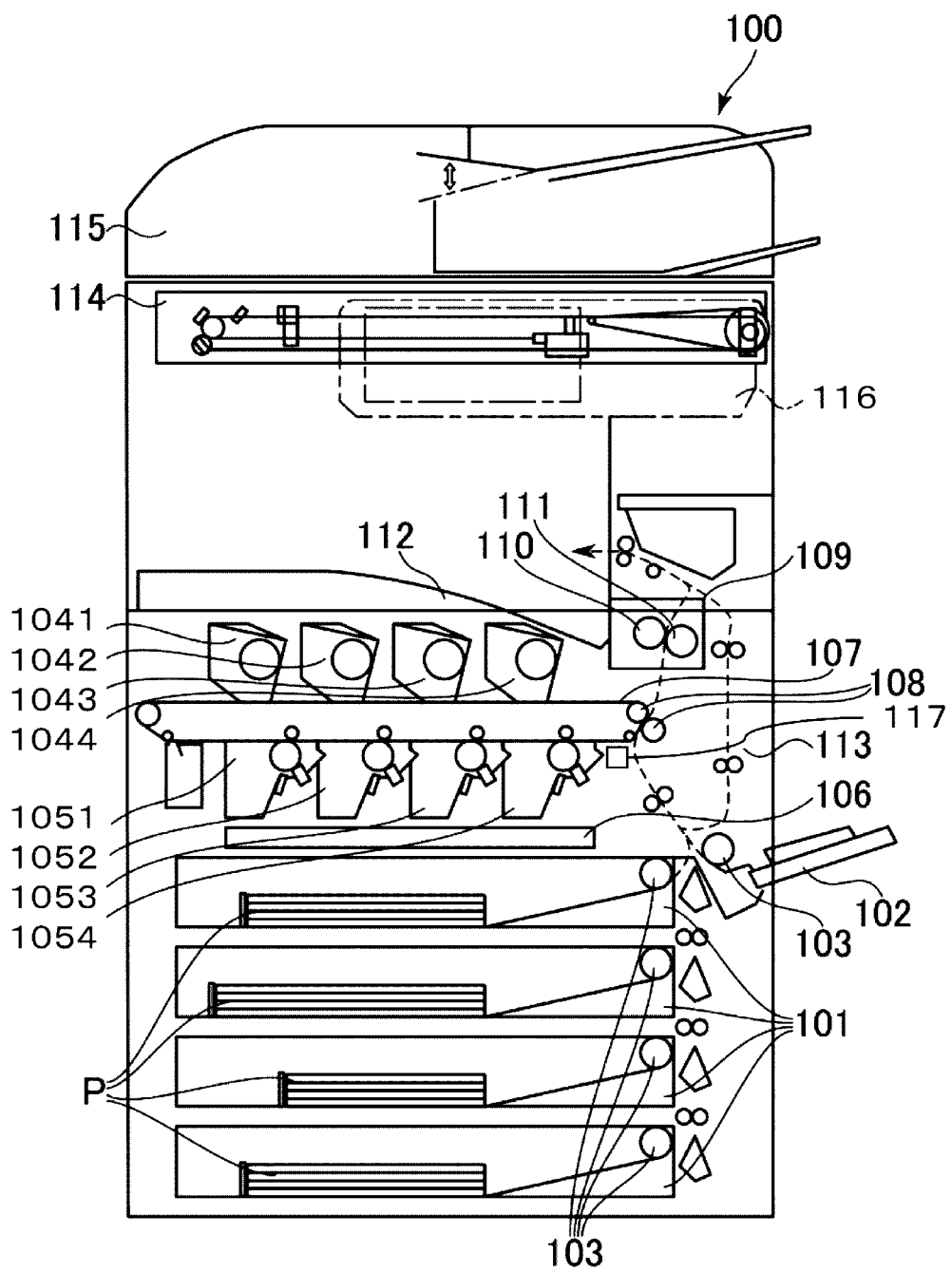
FIG. 1 is a schematic cross-sectional view illustrating an example of an image forming device according to a first embodiment to a third embodiment.

FIG. 1 is a schematic cross-sectional view illustrating an example of an image forming device 100 according to the first embodiment. The image forming device 100 will be described with reference to FIG. 1.

The image forming device 100 performs printing by an electrophotographic system. The image forming device 100 is, for example, a multifunction peripheral (MFP), a copier, a printer, or a facsimile. As illustrated in FIG. 1, the image forming device 100 includes, for example, a paper feed tray 101, a manual feed tray 102, a paper feed roller 103, toner cartridges 104, image forming units 105, a transfer belt 107, a transfer roller 108, a fixing unit 109, a heating unit 110, a pressure roller 111, a paper discharge tray 112, a duplex unit 113, a scanning unit 114, a document feeder 115, a control panel 116, and an image quality maintenance control unit 117.

The image forming units 105 print an image by the electrophotographic system. That is, the image forming units 105 form an image on an image forming medium P or the like using toner. The image forming medium P is, for example, sheet-shaped paper. The scanning unit 114 reads an image from a document or the like on which the image is formed. For example, the image forming device 100 executes document copying by printing, on the image forming medium P using the image forming units 105, an image read from the document or the like using the scanning unit 114.

The paper feed tray 101 accommodates the image forming medium P to be used for printing.

The manual feed tray 102 is a table for manually feeding the image forming medium P.

The paper feed roller 103 rotates by an action of a motor to convey, from the paper feed tray 101, the image forming medium P accommodated in the paper feed tray 101 or the manual feed tray 102. The toner cartridges 104 store toners to be supplied to the image forming units 105. The image forming device 100 includes a plurality of toner cartridges 104. As illustrated in FIG. 1, the image forming device 100 includes, for example, four toner cartridges 104 which are a toner cartridge 1041, a toner cartridge 1042, a toner cartridge 1043, and a toner cartridge 1044. The toner cartridge 1041, the toner cartridge 1042, the toner cartridge 1043, and the toner cartridge 1044 each store toner corresponding to a respective one of colors of cyan, magenta, yellow, and key (black) (CMYK). The colors of the toner stored in the toner cartridges 104 are not limited to the colors of the CMYK, and may be other colors. The toner stored in the toner cartridges 104 may be special toner. For example, the toner cartridges 104 may store decolorable toner that is decolored at a temperature higher than a predetermined temperature to be in an invisible state.

Each of the image forming units 105 includes a developing device, a photoreceptor drum, and the like. The developing device develops an electrostatic latent image on a surface of the photoreceptor drum using the toner supplied from the toner cartridges 104. Accordingly, a toner image is formed on the surface of the photoreceptor drum. The image formed on the surface of the photoreceptor drum is transferred (primary transfer) onto the transfer belt 107. The image forming device 100 includes a plurality of image forming units 105. As illustrated in FIG. 1, the image forming device 100 includes, for example, four image forming units 105 which are an image forming unit 1051, an image forming unit 1052, an image forming unit 1053, and an image forming unit 1054. The image forming unit 1051, the image forming unit 1052, the image forming unit 1053, and the image forming unit 1054 each form an image by receiving a supply of toner corresponding to a respective one of the colors of the CMYK.

An optical scanning device 106 is also referred to as a laser scanning unit (LSU) or the like. The optical scanning device 106 forms an electrostatic latent image on the surface of the photoreceptor drum of each image forming unit 105 by laser light controlled according to image data.

The transfer belt 107 is, for example, an endless belt, and is rotatable by an action of a roller. The transfer belt 107 rotates to convey the image transferred from each image forming unit to a position of the transfer roller 108.

The transfer roller 108 includes two rollers facing each other. The transfer roller 108 transfers (secondary transfer) the image formed on the transfer belt 107 onto the image forming medium P passing between the rollers of the transfer roller 108.

The fixing unit 109 applies heat and pressure to the image forming medium P onto which the image is transferred. Accordingly, the image transferred onto the image forming medium P is fixed. The fixing unit 109 includes the heating unit 110 and the pressure roller 111 facing each other.

The heating unit 110 is, for example, a roller including a heat source that heats the heating unit 110. The heat source is, for example, a heater. The roller heated by the heat source heats the image forming medium P.

Alternatively, the heating unit 110 may also include an endless belt suspended by a plurality of rollers. For example, the heating unit 110 includes a plate-shaped heat source, an endless belt, a belt conveyance roller, a tension roller, and a press roller. The endless belt is, for example, a film-shaped member. The belt conveyance roller drives the endless belt. The tension roller applies tension to the endless belt. The press roller is formed with an elastic layer on a surface of the press roller. In the plate-shaped heat source, by bringing a heating portion side into contact with an inner side of the endless belt and pressing the heating portion side in a direction of the press roller, a fixing nip having a predetermined width is formed between the plate-shaped heat source and the press roller. Since the plate-shaped heat source performs heating while forming a nip region, responsiveness during energization is higher than that in a case of a heating system using a halogen lamp.

In the endless belt, for example, a silicon rubber layer having a thickness of 200 μm is formed on an outer side of a steel use stainless (SUS) base material having a thickness of 50 μm or polyimide which is a heat-resistant resin having a thickness of 70 μm, and the outermost periphery is coated with a surface protective layer such as perfluoroalkoxy alkane (PFA). In the press roller, for example, a silicon sponge layer having a thickness of 5 mm is formed on a surface of an iron rod having a diameter of 10 mm, and the outermost periphery is coated with a surface protective layer such as PFA.

In the plate-shaped heat source, for example, a glaze layer and a heating resistance layer are laminated on a ceramic substrate. An aluminum heat sink is bonded to the plate-shaped heat source in order to release excessive heat to an opposite side and to prevent warpage of the substrate. The heating resistance layer is formed of a known material such as TaSiO2, and is divided into a predetermined length and a predetermined number in the main scanning direction.

The pressure roller 111 applies pressure to the image forming medium P passing between the pressure roller 111 and the heating unit 110.

The paper discharge tray 112 is a table. The image forming medium P on which printing is completed is discharged to the table.

The duplex unit 113 brings the image forming medium P into a state in which printing on a back surface is possible. For example, the duplex unit 113 inverts surface and back surface of the image forming medium P by switching back the image forming medium P using a roller or the like.

The scanning unit 114 reads an image from a document. The scanning unit 114 corresponds to a scanner that reads an image from a document.

The scanner is, for example, an optical reduction system including an imaging element such as a charge-coupled device (CCD) image sensor. Alternatively, the scanner may be a contact image sensor (CIS) system including an imaging element such as a complementary metal-oxide-semiconductor (CMOS) image sensor. Alternatively, the scanner may be another known system.

The document feeder 115 is also referred to as, for example, an auto document feeder (ADF). The document feeder 115 sequentially conveys documents placed on a document tray. Images of the conveyed documents are read by the scanning unit 114. The document feeder 115 may include a scanner that reads an image from a back surface of a document.

The control panel 116 functions as a user interface, and includes buttons, a touch panel, and the like for an operator to operate the image forming device 100. The touch panel is, for example, a laminate of a display such as a liquid crystal display or an organic EL display and a pointing device based on a touch input. Therefore, the buttons and the touch panel function as an input device that receives an operation performed by the operator of the image forming device 100. The display provided in the touch panel functions as a display device that notifies the operator of the image forming device 100 of various types of information.

Figure 2:
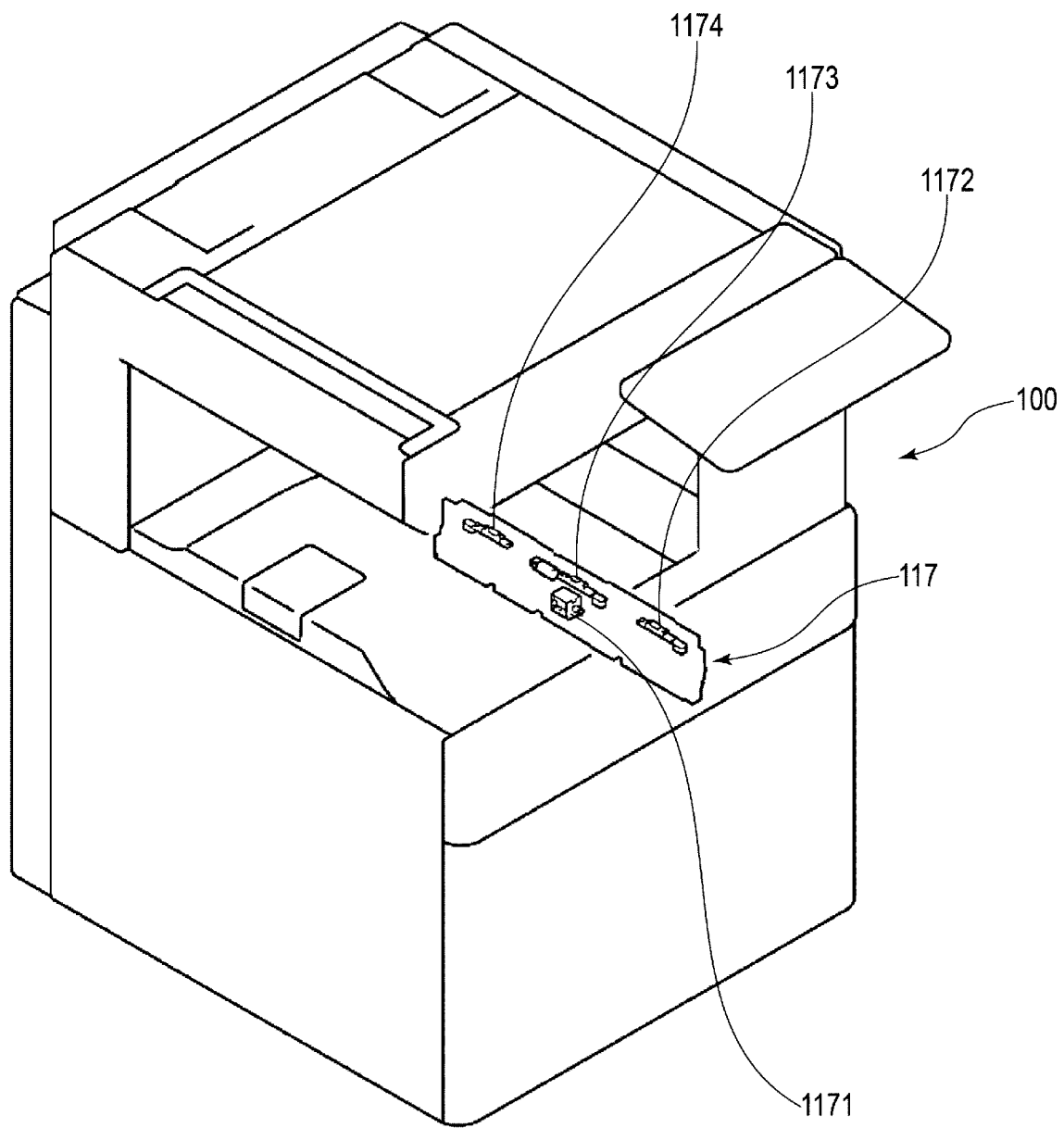
FIG. 2 is a perspective view illustrating an example of an image quality maintenance control unit together with the image forming device.
Figure 3:
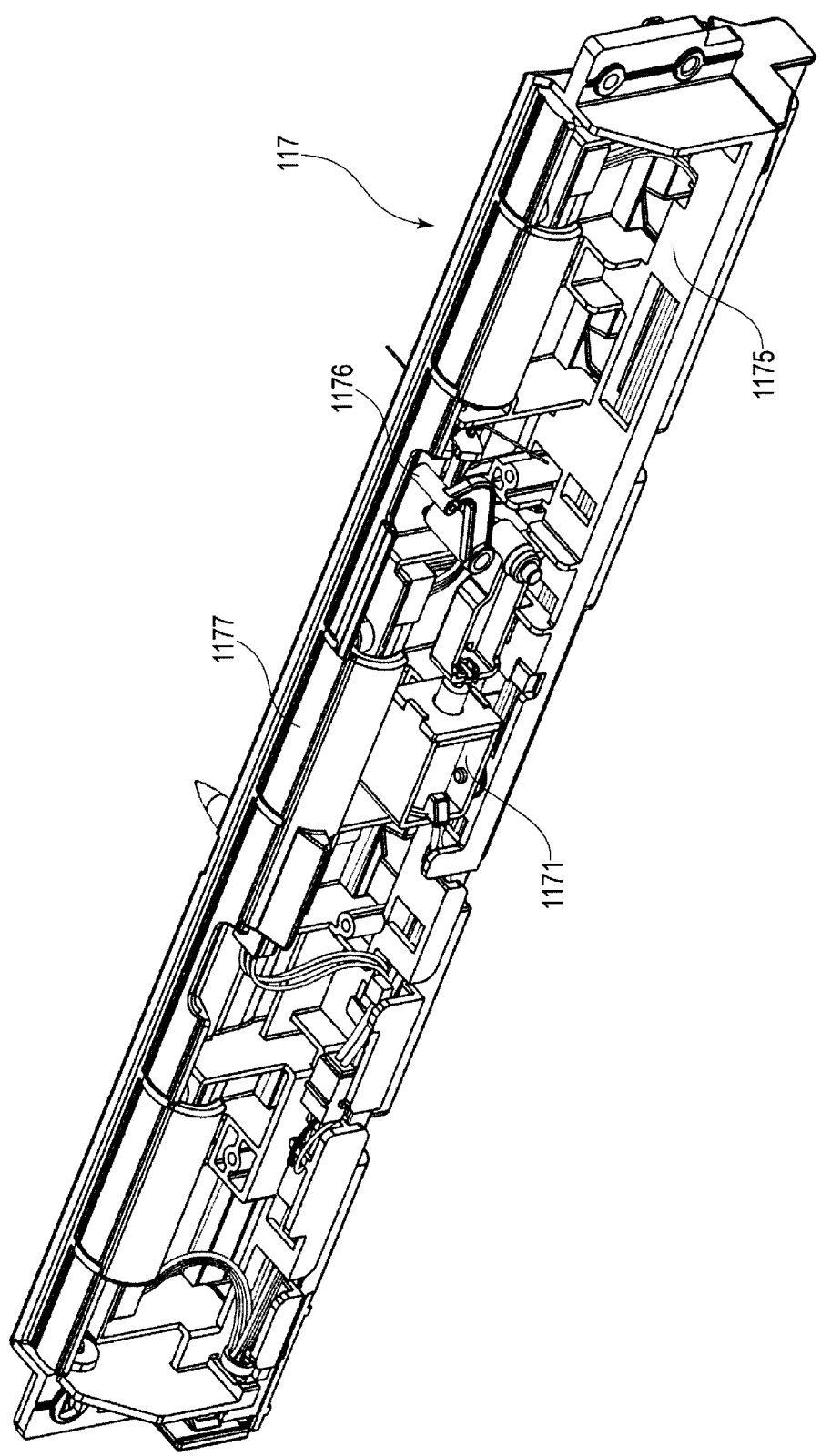
FIG. 3 is a schematic configuration diagram illustrating an example of the image quality maintenance control unit.
Figure 4:
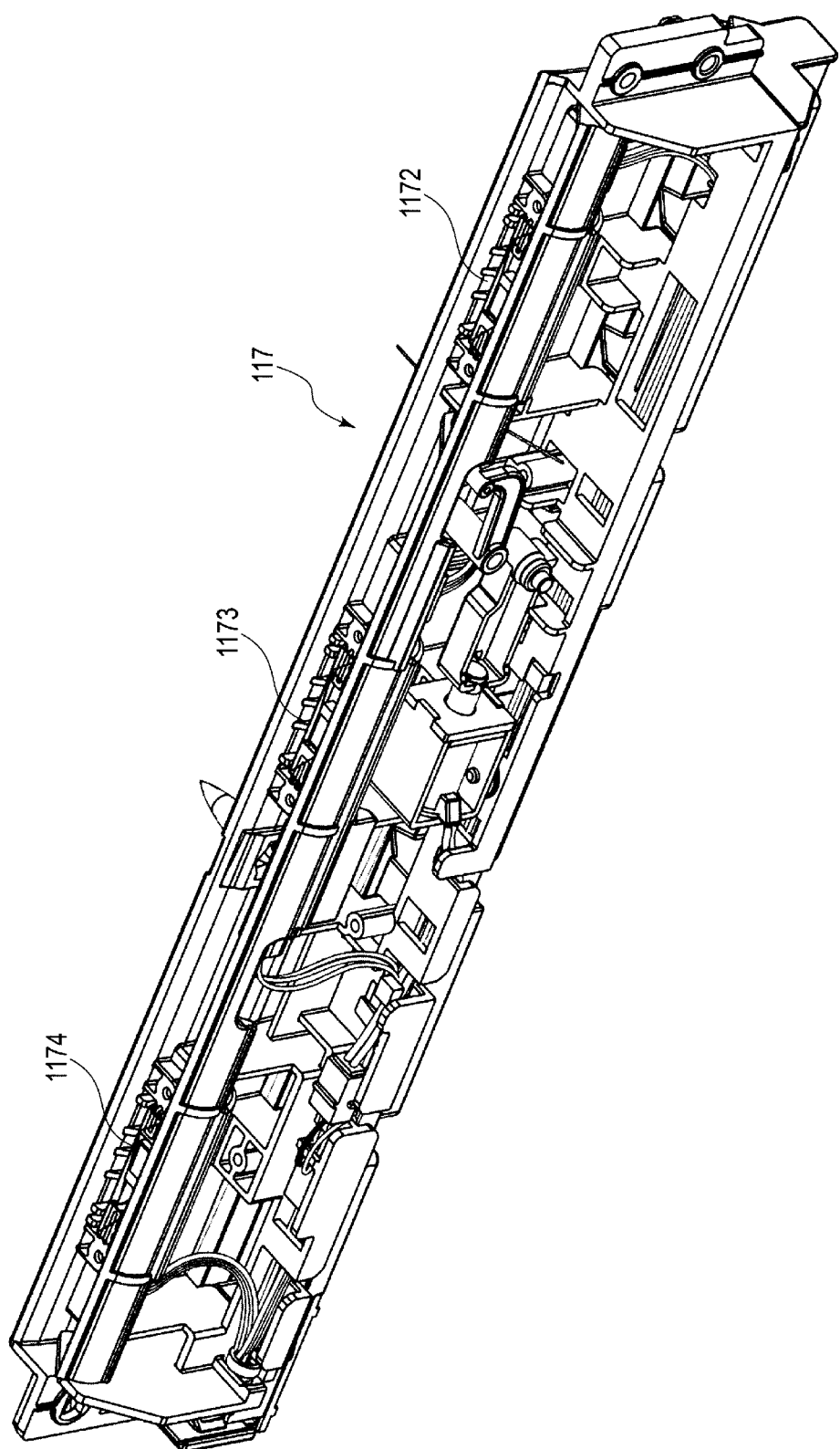
FIG. 4 is a schematic configuration diagram illustrating a state in which a shutter is opened.

The image quality maintenance control unit 117 will be described with reference to FIGS. 2 to 4. FIG. 2 is a perspective view illustrating an example of the image quality maintenance control unit 117 together with the image forming device 100 illustrated in FIG. 1. FIG. 3 is a schematic configuration diagram illustrating an example of the image quality maintenance control unit 117 in FIG. 2. FIG. 4 is a schematic configuration diagram illustrating an example of the image quality maintenance control unit 117 in FIG. 2 in a state in which a shutter 1177 is opened. In the first embodiment, an image quality maintenance control executed by the image quality maintenance control unit 117 will be described as an example of a performance maintenance control.

The image quality maintenance control unit 117 includes, for example, a sensor shutter solenoid 1171, an image detection sensor (front) 1172, an image detection sensor (center) 1173, an image detection sensor (rear) 1174, a unit base 1175, a lever 1176, and the shutter 1177.

The image quality maintenance control unit 117 executes the image quality maintenance control based on an adjustment pattern formed on the transfer belt 107. For example, the image quality maintenance control includes an image quality adjustment control and a color registration control. The image quality maintenance control unit 117 changes image forming conditions and adjusts an image density and a tone reproducibility by the image quality adjustment control. The image quality adjustment control minimizes changes in the image density and the tone reproducibility due to use environment and consumable life. The image quality maintenance control unit 117 adjusts a printing position of each color according to the color registration control. The color registration control optimizes color reproducibility and prevents a color shift.

The image detection sensor (front) 1172, the image detection sensor (center) 1173, and the image detection sensor (rear) 1174 are attached to the inside of a pre-secondary transfer guide on a lower side of the transfer belt 107. The image detection sensor (center) 1173 has two functions of an image detection sensor and a toner adhesion amount sensor.

The sensor shutter solenoid 1171 drives the shutter 1177 that covers the image detection sensor (front) 1172, the image detection sensor (center) 1173, and the image detection sensor (rear) 1174. The lever 1176 opens and closes the shutter 1177 in cooperation with driving of the sensor shutter solenoid 1171.

The shutter 1177 protects, in order to prevent contamination due to a toner scattering from the transfer belt 107, the image detection sensor (front) 1172, the image detection sensor (center) 1173, and the image detection sensor (rear) 1174 except for a performance maintenance control operation.

Figure 5:
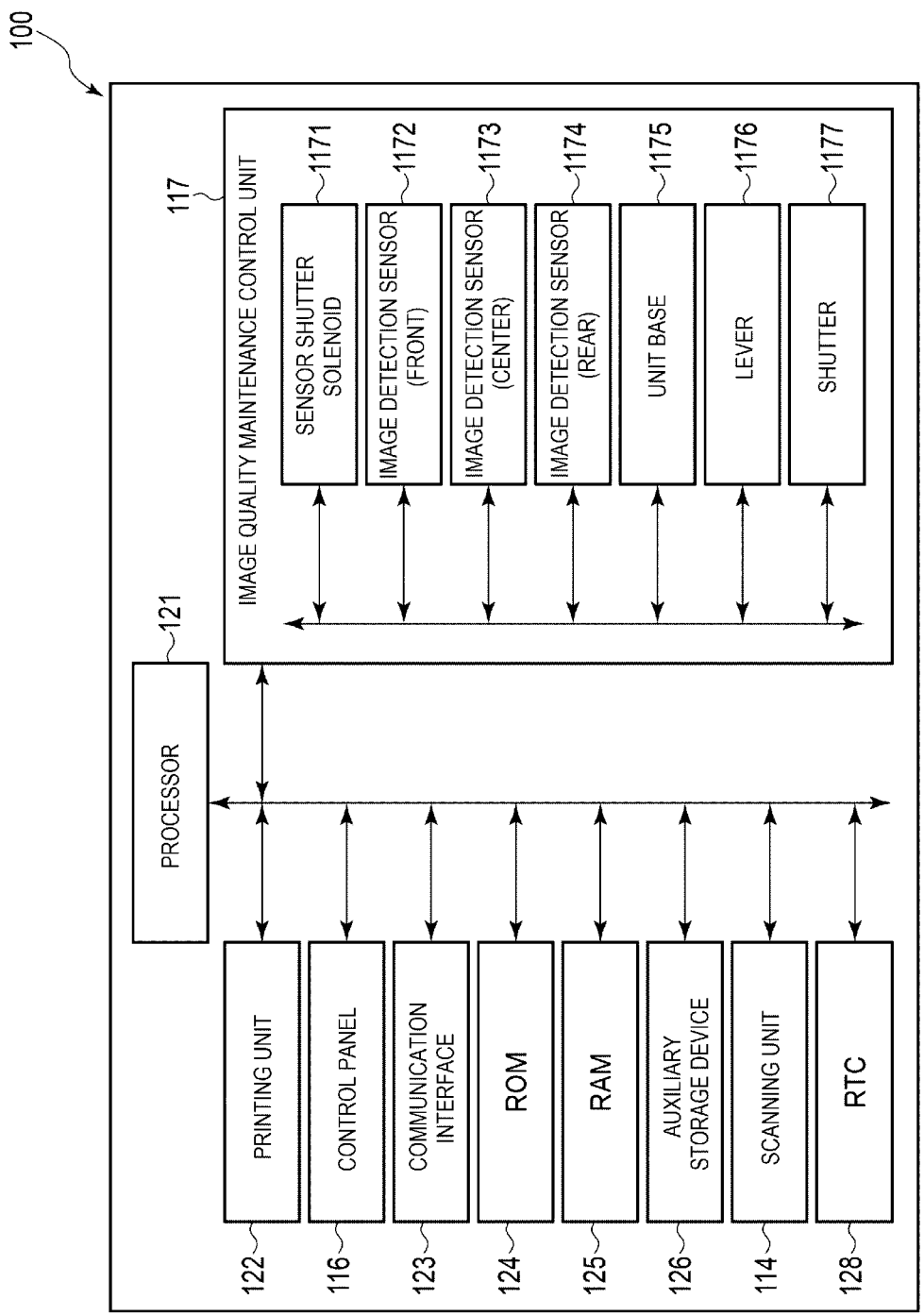
FIG. 5 is a block diagram illustrating an example of a circuit configuration of the image forming device according to the first embodiment to the third embodiment.

FIG. 5 is a block diagram illustrating an example of a circuit configuration of the image forming device 100 according to the first embodiment.

The image forming device 100 includes, for example, a processor 121, a printing unit 122, the control panel 116, a communication interface 123, a read-only memory (ROM) 124, a random-access memory (RAM) 125, an auxiliary storage device 126, the scanning unit 114, a real-time clock (RTC) 128, and the image quality maintenance control unit 117.

The processor 121 corresponds to a central part of a computer that performs processing such as calculations and controls necessary for an operation of the image forming device 100. The processor 121 controls each unit in order to achieve various functions of the image forming device 100 based on a program such as system software, application software, or firmware stored in the ROM 124, the auxiliary storage device 126, or the like. The processor 121 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), or a field-programmable gate array (FPGA). Alternatively, the processor 121 may be a combination of a plurality of these devices.

The ROM 124 is a non-transitory computer readable storage medium, and corresponds to a main storage device of a computer including the processor 121 as the central part. The ROM 124 is a nonvolatile memory exclusively used for reading data. The ROM 124 stores data used when the processor 121 executes various types of processing, various set values, or the like.

The RAM 125 corresponds to the main storage device of the computer including the processor 121 as the central part. The RAM 125 is a memory used for reading and writing data. The RAM 125 is used as a so-called work area in which data is temporarily stored when the processor 121 executes various types of processing.

The auxiliary storage device 126 is a non-transitory computer readable storage medium, and corresponds to an auxiliary storage device of the computer including the processor 121 as the central part. The auxiliary storage device 126 is, for example, an electric erasable programmable read-only memory (EEPROM) (registered trademark), a hard disk drive (HDD), or a solid state drive (SSD). The auxiliary storage device 126 stores data used when the processor 121 executes various types of processing, data generated by the processing of the processor 121, various set values, or the like.

For example, the auxiliary storage device 126 is a memory that stores various types of information, and stores the number of printed sheets of the image forming medium P, the number of scanned sheets of the image forming medium P, the number of times of power-on and power-off, and the number of execution times of the performance maintenance control.

The processor 121 counts the number of the printed sheets based on a detection signal of the image forming medium P to be output from the printing unit 122, and outputs the counted number of the printed sheets to the auxiliary storage device 126 as an execution history. The execution history includes the total number of the printed sheets from the start of use of the image forming device 100 to the present, and the number of the printed sheets in a certain period from a reception of a count reset to the present.

The processor 121 counts the number of the scanned sheets based on a detection signal of a sheet to be scanned output from the scanning unit 114, and outputs the counted number of the scanned sheets to the auxiliary storage device 126 as the execution history. The execution history includes the total number of the scanned sheets from the start of use of the image forming device 100 to the present, and the number of the scanned sheets in a certain period from a reception of a count reset to the present.

The execution history may include at least one of the number of the printed sheets and the number of the scanned sheets. When the execution history does not include the printed sheet number but includes the scanned sheet number, the processor 121 detects a load due to a scanning operation based on the number of the scanned sheets and a load due to a printing operation estimated based on the number of the scanned sheets. When the execution history includes the number of the printed sheets and the number of the scanned sheets, the processor 121 detects the load due to the scanning operation based on the number of the scanned sheets and detects the load due to the printing operation based on the number of the printed sheets.

The processor 121 counts the number of times the image quality maintenance control is executed based on a signal from the image quality maintenance control unit 117, and outputs the counted number of execution times of the image quality maintenance control to the auxiliary storage device 126 as an adjustment history of image processing. The image quality maintenance control is an example of the performance maintenance control, and the number of execution times of the image quality maintenance control can be read as the number of execution times of the performance maintenance control.

The processor 121 counts at least the number of times of power-on or power-off based on a signal from the control panel 116 or a power supply circuit, and outputs the counted number of times as an energization history to the auxiliary storage device 126. The processor 121 may count power-on and power-off as one time.

As described above, the auxiliary storage device 126 stores the execution history of the image processing, the adjustment history of the image processing, and the energization history.

The image forming device 100 may include, instead of or in addition to the auxiliary storage device 126, an interface into which a storage medium such as a removable optical disk, a memory card, or a universal serial bus (USB) memory can be inserted.

A program to be stored in the ROM 124 or the auxiliary storage device 126 includes a program for executing processing to be described later. As an example, the image forming device 100 is transferred to an administrator or the like of the image forming device 100 in a state in which the program is stored in the ROM 124 or the auxiliary storage device 126. However, the image forming device 100 may be transferred to the administrator or the like in a state in which the program is not stored in the ROM 124 or the auxiliary storage device 126. Further, the program for executing the processing to be described later may be separately transferred to the administrator or the like, and may be written in the ROM 124 or the auxiliary storage device 126 under an operation of the administrator, a serviceman, or the like. The transfer of the program at this time can be executed by, for example, recording the program in a removable storage medium such as a magnetic disk, a magneto-optical disk, an optical disk, or a semiconductor memory, or downloading the program via a network or the like.

The communication interface 123 is an interface for the image forming device 100 to communicate with a server 200 or the like via a network or the like.

The RTC 128 is a clock, a circuit having a built-in clock function, or the like.

Next, an example of an operation of the image quality adjustment control will be described. The image quality maintenance control unit 117 operates the image detection sensor (center) 1173 in a state in which toner is not formed on the transfer belt 107. Thereafter, the image detection sensor (center) 1173 outputs a reflected light amount voltage, analog-digital converts the output voltage, and outputs a reflected light amount signal. The image quality maintenance control unit 117 adjusts the reflected light amount voltage of the image detection sensor (center) 1173 such that the output reflected light amount signal matches a preset value, and stores an output value of the reflected light amount signal at that time in the memory. This output value is defined as a read value of a belt surface. Next, the image quality maintenance control unit 117 develops a test pattern on the transfer belt 107, and outputs a reflected light amount signal at that time. This output value is defined as a read value of the toner image. The image quality maintenance control unit 117 sets a difference between the read value of the belt surface and the read value of the toner image as a toner adhesion amount, and determines the image forming conditions and image processing conditions such that the toner adhesion amount approaches a preset value.

The above-mentioned series of operations are executed by the image quality maintenance control unit 117, and are not limited thereto. The operations may be executed by, for example, the processor 121 or the like.

Figure 6:
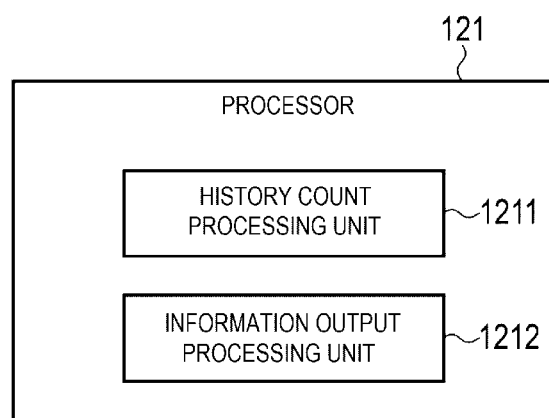
FIG. 6 is a block diagram illustrating an example of a configuration of a processor.

An example of a configuration of the processor 121 of the image forming device 100 will be described with reference to FIG. 6. FIG. 6 is a block diagram illustrating an example of the configuration of the processor 121 of the image forming device 100 according to the first embodiment.

The processor 121 includes a history count processing unit 1211 and an information output processing unit 1212. The processor 121 achieves functions of the units of the history count processing unit 1211 and the information output processing unit 1212 by executing a program stored in the ROM 124, the auxiliary storage device 126, or the like. The history count processing unit 1211 and the information output processing unit 1212 may be implemented by hardware such as a large scale integration (LSI), an application specific integrated circuit (ASIC), and a field-programmable gate array (FPGA) that have the same functions as that of the processor 121 executing the program.

The history count processing unit 1211 executes count processing at a predetermined timing. For example, the history count processing unit 1211 detects power-on or power-off, increases the number of counts of the energization history according to a detection result, increases the number of counts of the adjustment history according to a completion of execution of the performance maintenance control, or increases the number of counts of the execution history according to a print execution command or detection of a printed sheet.

The information output processing unit 1212 executes information output processing. After history count processing is executed, for example, the information output processing unit 1212 acquires the energization history, the execution history, and the adjustment history that are stored in the auxiliary storage device 126. The information output processing unit 1212 determines whether there is a correlation between the energization history and the adjustment history, or whether there is a correlation between the execution history and the adjustment history, and executes instructing to output a detection result after detecting an occurrence of an event.

Figure 7:
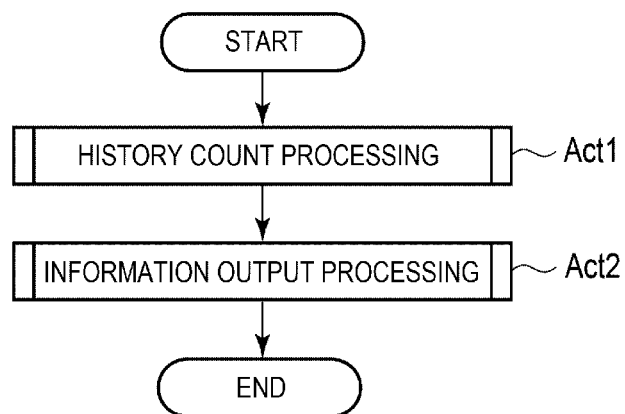
FIG. 7 is a flowchart illustrating an example of overall operations.

Hereinafter, the operation of the image forming device 100 according to the first embodiment will be described with reference to FIGS. 7, 8, and 9. A content of the processing in the following operation description is an example, and various types of processing capable of attaining the same effect can be appropriately used. FIG. 7 is a flowchart illustrating an example of an overall operation performed by the image forming device according to the first embodiment. The processor 121 executes this processing based on a program stored in the ROM 124, the auxiliary storage device 126, or the like. Unless otherwise specified, the processing of the processor 121 transitions to Act (N+1) after Act N (N is a natural number).

The image forming device 100 starts the processing illustrated in FIG. 7 at a predetermined timing. In Act 1, for example, if the power supply is turned on, the processor 121 (the history count processing unit 1211) detects the power-on and increases the number of counts of the energization history by one. Similarly, if the power supply is turned off, the processor 121 detects the power-off and increases the number of counts of the energization history by one. If the power supply is turned on and then turned off, the processor 121 may detect the power-on and the power-off and increase the number of counts of the energization history by one.

When the power supply is turned on, the processor 121 detects the power-on state, executes the performance maintenance control, and counts the number of execution times. If the performance maintenance control is determined to be normally ended, the processor 121 increases the number of counts of the adjustment history by one. If the performance maintenance control is determined to be abnormally ended, the processor 121 does not increase the number of counts of the adjustment history and maintains the state as it is.

The processor 121 executes a print control based on a print command, counts the number of the printed sheets, and increases the number of counts of the execution history. Alternatively, the processor 121 executes a scanning control based on a scanning command, counts the number of the scanned sheets, and increases the number of counts of the execution history.

The processor 121 executes the performance maintenance control according to the increase in the number of the printed sheets, and counts the number of execution times. If the performance maintenance control is determined to be normally ended, the processor 121 increases the number of counts of the adjustment history by one. If the performance maintenance control is determined to be abnormally ended, the processor 121 does not increase the number of counts of the adjustment history and maintains the state as it is.

The processor 121 stores, in the auxiliary storage device 126, the number of counts of the energization history, the number of counts of the execution history, and the number of counts of the adjustment history. The history count processing will be described in detail later.

In Act 2, the processor 121 (the information output processing unit 1212) acquires, for example, the number of counts of the energization history, the number of counts of the execution history, and the number of counts of the adjustment history that are stored in the auxiliary storage device 126. The processor 121 determines whether there is a correlation between the number of counts of the energization history and the number of counts of the adjustment history, or whether there is a correlation between the number of counts of the execution history and the number of counts of the adjustment history, detects an occurrence of an event, and executes instructing to output information according to a detection result. The information output processing will be described in detail later.

Figure 8:
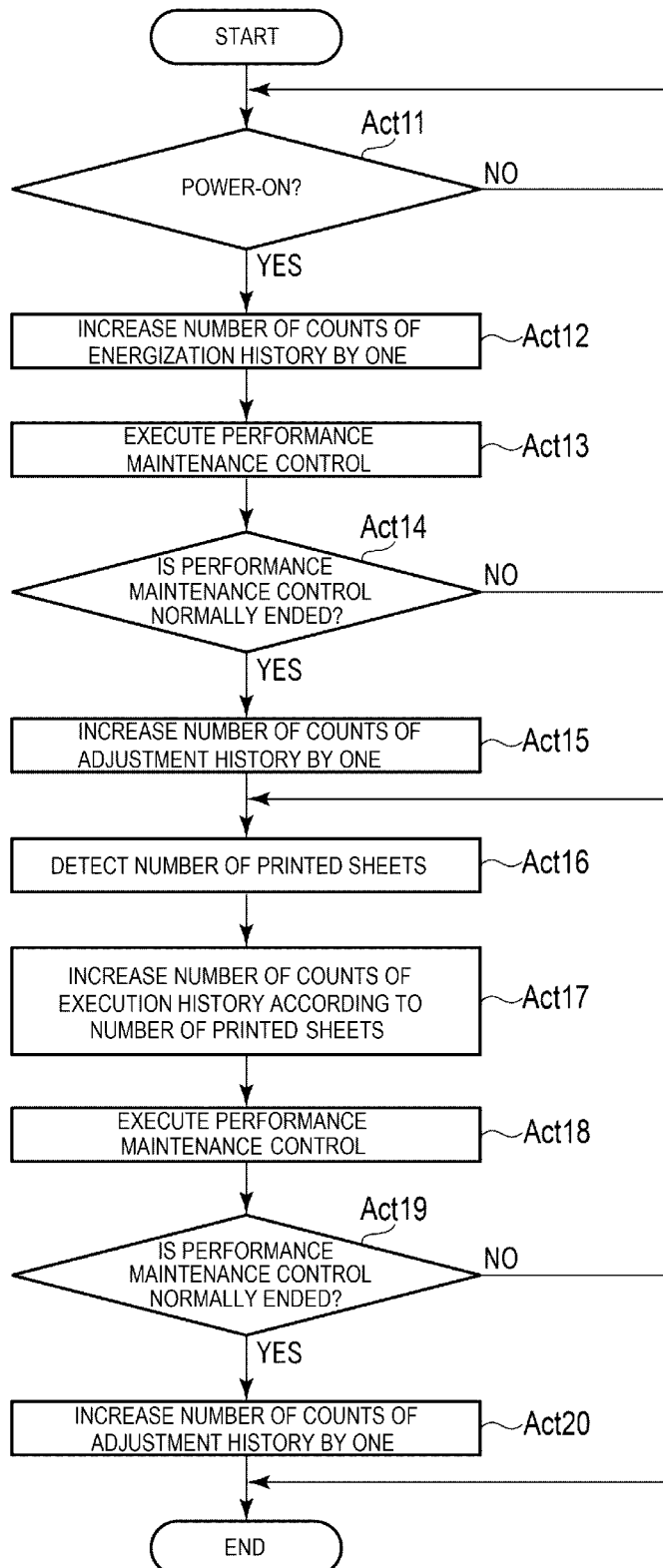
FIG. 8 is a flowchart illustrating an example of a history count processing operation.

FIG. 8 is a flowchart illustrating an example of a history count processing operation executed by the image forming device according to the first embodiment. That is, FIG. 8 is a flowchart illustrating the history count processing in Act 1 illustrated in FIG. 7 in detail.

The image forming device 100 starts the processing illustrated in FIG. 8. The processor 121 monitors an energization state of the power supply, and continues the monitoring when the power supply is not turned on (NO in Act 11). The image forming device 100 selectively executes, based on a designation from the control panel 116, a normal operation mode in which predetermined power is consumed and a low-power operation mode in which power consumption is less than the consumption of the predetermined power. The processor 121 also executes the above-mentioned operations if the image forming device 100 returns from the low-power operation mode (a so-called sleep state or standby state) to the normal mode.

The processor 121 detects a power-on state (YES in Act 11), and increases the number of counts of the energization history by one (Act 12). The processor 121 detects power-off and increases the number of counts of the energization history by one. The processor 121 may detect last power-off based on a detection of the power-on. Alternatively, the processor 121 may increase the number of counts of the energization history by one based on the detection of the power-on and the subsequent detection of power-off. The number of counts of the energization history may be always stored in the memory and may be stored at any timing. The number of counts of the energization history stored in the auxiliary storage device 126 is referred to as an energization history En1.

The processor 121 executes the performance maintenance control based on the detection of the power-on state (Act 13). For example, the performance maintenance control executed in Act 13 is the image quality adjustment control. The performance maintenance control may be the color registration control, or may be both the image quality adjustment control and the color registration control.

The processor 121 determines whether the performance maintenance control is normally ended (Act 14). Based on a determination of normal end of the performance maintenance control (YES in Act 14), the processor 121 increases the number of counts of the adjustment history by one (Act 15). Based on a determination of abnormal end of the performance maintenance control (NO in Act 14), the processor 121 maintains the current number of counts of the adjustment history. The number of counts of the adjustment history may be always stored in the auxiliary storage device 126 and may be stored at any timing. The number of counts of the adjustment history stored in the auxiliary storage device 126 is referred to as an adjustment history Ad1.

The processor 121 executes a print control based on a print command from the control panel 116 or the communication interface 123, and detects the number of the printed sheets (Act 16). The processor 121 increases the number of counts of the execution history according to the number of the printed sheets (Act 17). The number of counts of the execution history may be increased every time one sheet is printed, or may be increased in units of a predetermined number of sheets such as 10 sheets or 100 sheets. The increased number of counts of the execution history may be always stored in the auxiliary storage device 126 and may be stored at any timing. The number of counts of the execution history stored in the auxiliary storage device 126 is referred to as an execution history Ex1.

Although FIG. 6 illustrates the number of the printed sheets as an example of the execution history, the execution history may be, for example, the number of the scanned sheets, and a value obtained by combining the number of the printed sheets and the number of the scanned sheets may be stored in the auxiliary storage device 126 as the execution history. Since the performance maintenance control can be executed at any timing, for example, the processor 121 may execute the performance maintenance control if the number of the printed sheets or the number of the scanned sheets is determined as exceeding a predetermined value.

The processor 121 executes the performance maintenance control according to the increase in the number of the printed sheets (Act 18). The processor 121 executes the performance maintenance control in units of, for example, 10 sheets to be printed. The setting of the number of the printed sheets for which the performance maintenance control is executed is not limited thereto, and can be set in advance by a user or the like.

The processor 121 determines whether the performance maintenance control is normally ended (Act 19). Based on a determination of normal end of the performance maintenance control (YES in Act 19), the processor 121 increases the number of counts of the adjustment history by one (Act 20), and ends the processing. Based on a determination of abnormal end of the performance maintenance control (NO in Act 19), the processor 121 ends the processing while maintaining the current number of counts of the adjustment history.

Figure 9:
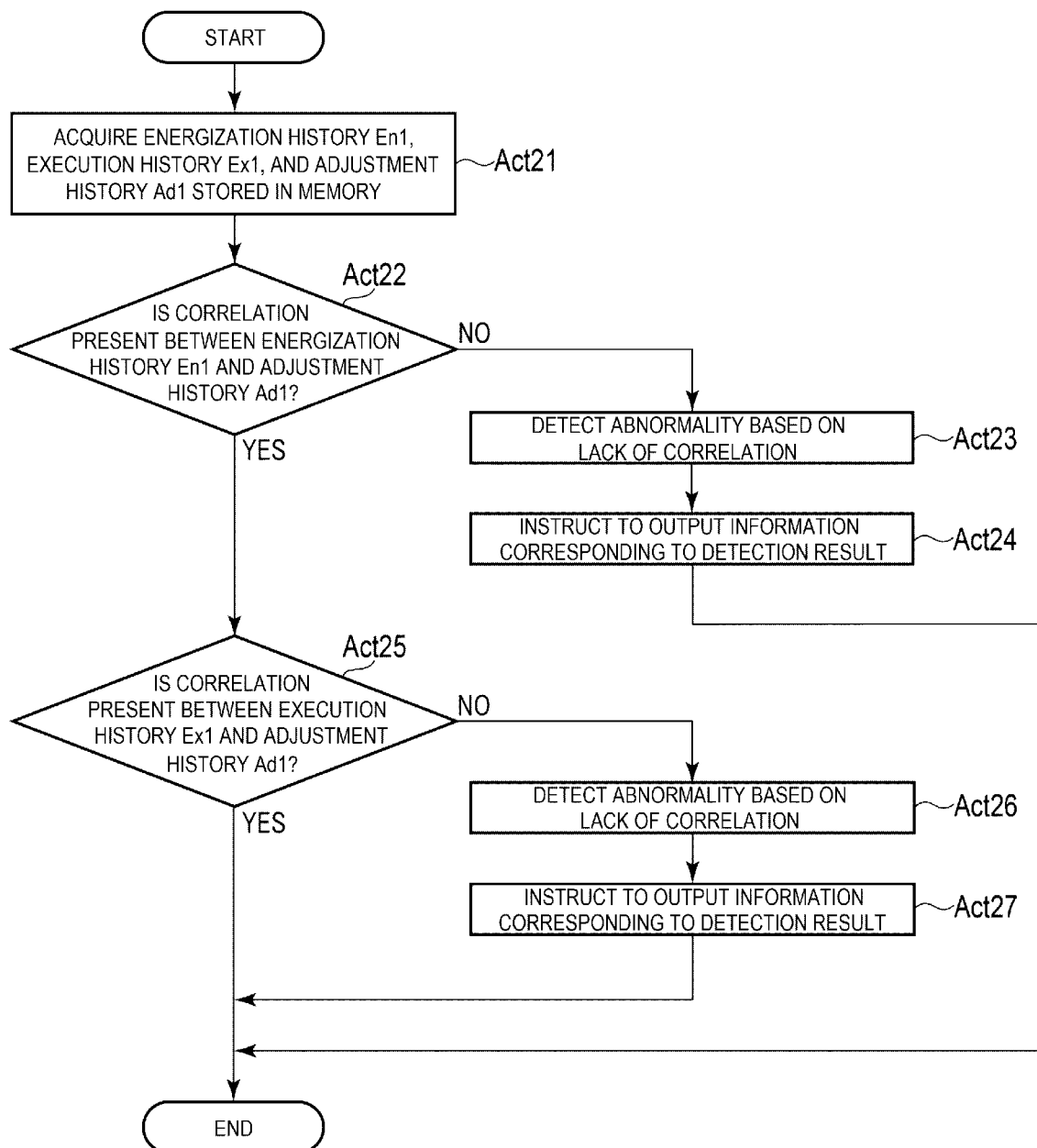
FIG. 9 is a flowchart illustrating an example of an information output processing operation executed by the image forming device according to the first embodiment.

FIG. 9 is a flowchart illustrating an example of an information output processing operation executed by the image forming device according to the first embodiment. That is, FIG. 9 is a flowchart illustrating the information output processing in Act 2 illustrated in FIG. 7 in detail.

The processor 121 acquires the energization history En1, the execution history Ex1, and the adjustment history Ad1 that are stored in the auxiliary storage device 126 (Act 21). The execution history Ex1 and the adjustment history Ad1 that are stored in the auxiliary storage device 126 are the number of counts after the power supply is turned on. However, resetting the execution history Ex1 and the adjustment history Ad1 that are stored in the auxiliary storage device 126 each time the power supply is turned off is not essential, for example, a total number of the printed sheets from an initialization state to the present may be set as the execution history Ex1, and a total number of times of the performance maintenance control from the initialization state to the present may be set as the adjustment history Ad1.

The processor 121 determines a correlation between the energization history En1 and the adjustment history Ad1 (Act 22). For example, the processor 121 expresses the energization history En1 and the adjustment history Ad1 as a linear function, and determines whether there is a correlation between the energization history En1 and the adjustment history Ad1. As another example, the processor 121 determines whether there is a correlation between the energization history En1 and the adjustment history Ad1 by measuring a nonlinear function, a correlation function, and a correlation coefficient. However, the correlation determination is not limited to the above, and the processor 121 can determine a lack of correlation if the state deviates from a case in which executing any performance maintenance control simply in any number of sheets is stored in the auxiliary storage device 126.

When a correlation is determined to be present between the energization history En1 and the adjustment history Ad1 according to any method (YES in Act 22), the processor 121 executes the following correlation determination (Act 25). When a lack of correlation is determined between the energization history En1 and the adjustment history Ad1 (NO in Act 22), the processor 121 detects an occurrence (an abnormality) of an event based on the lack of correlation (Act 23). The detection of the abnormality may be regarded as an estimation or a prediction of the abnormality. The abnormality is, for example, a failure of the image quality maintenance control unit 117. The determination of the lack of correlation is due to, for example, that the adjustment history Ad1 is less since the performance maintenance control is abnormally ended and the number of counts of the adjustment history is not increased in the present embodiment.

As an example of the failure of the image quality maintenance control unit 117, the lever 1176 or the sensor shutter solenoid 1171 may be damaged, the shutter 1177 may not be opened or closed, the image detection sensor (front) 1172, the image detection sensor (center) 1173, and the image detection sensor (rear) 1174 may not be exposed, and the adjustment pattern may not be read. As another example, if the shutter 1177 is always open, toner accumulates on the image detection sensor (front) 1172, the image detection sensor (center) 1173, and the image detection sensor (rear) 1174, and the sensor surfaces are shielded from light. Therefore, control may not be normally executed.

The processor 121 detects the abnormality (ACT 23) and executes instructing to output the information according to a detection result (ACT 24). For example, the control panel 116 outputs information indicating the abnormality by an image or a sound.

An output destination of information is not limited to the control panel 116, and may be any device capable of providing the information to the user. For example, the communication interface 123 outputs (transmits) the information to a designated communication device, and the designated communication device receives the information and provides (displays or the like) the information to the user. The communication interface 123 outputs (transmits) the information to another designated image forming device 100, the other designated image forming device 100 receives the information, and the control panel 116 of the other image forming device 100 provides (displays or the like) the information to the user.

The processor 121 continues the output of the information indicating the abnormality while a lack of correlation is determined between the energization history En1 and the adjustment history Ad1, and the processor 121 stops the output of the information indicating the abnormality if a correlation is determined to be present between the execution history Ex1 and the adjustment history Ad1.

The processor 121 determines the correlation between the execution history Ex1 and the adjustment history Ad1 (Act 25). For example, the processor 121 expresses the execution history Ex1 and the adjustment history Ad1 as a linear function, and determines whether there is a correlation between the execution history Ex1 and the adjustment history Ad1. As another example, the processor 121 determines whether there is a correlation between the execution history Ex1 and the adjustment history Ad1 by measuring a nonlinear function, a correlation function, and a correlation coefficient. However, the correlation determination is not limited to the above, and the processor 121 can determine a lack of correlation if the state deviates from a case in which executing any performance maintenance control simply in any number of sheets is stored in the auxiliary storage device 126.

When a correlation is determined to be present between the execution history Ex1 and the adjustment history Ad1 according to any method (YES in Act 25), the processor 121 ends the processing. When a lack of correlation is determined between the execution history Ex1 and the adjustment history Ad1 (NO in Act 25), the processor 121 detects an occurrence (an abnormality) of an event (Act 26).

The processor 121 detects the abnormality (ACT 26) and executes instructing to output information according to a detection result (ACT 27). For example, the control panel 116 outputs information indicating the abnormality by an image or a sound.

The processor 121 continues the output of the information indicating the abnormality while a lack of correlation is determined between the execution history Ex1 and the adjustment history Ad1, and the processor 121 stops the output of the information indicating the abnormality when a correlation is determined to be present between the execution history Ex1 and the adjustment history Ad1.

As described above, the processor 121 detects the occurrence of the event based on the correlation between the energization history and the adjustment history by the processing in Act 22 to Act 24, detects the occurrence of the event based on the correlation between the execution history and the adjustment history by the processing in Act 25 to Act 27, and executes instructing to output information according to a detection result. For example, the processor 121 detects the abnormality based on the lack of correlation by the processing in Act 22, Act 23, Act 25, and Act 26.

FIG. 10 is a diagram illustrating an example of the number of counts and presence of correlations of the energization history, the execution history, and the adjustment history in the image forming device according to the first embodiment. For example, as illustrated in FIG. 10, if the power supply is turned on, the processor 121 serving as a counter increases the energization history by one. Thereafter, the processor 121 executes the image quality adjustment control as the performance maintenance control. If the processing is normally ended, the processor 121 increases the adjustment history by one. If the processor 121 executes the print control based on the print command, the processor 121 increases the execution history according to the number of the printed sheets. For example, in FIG. 10, printing of four sheets is executed. Thereafter, the processor 121 executes the color registration control as the performance maintenance control. If the processing is normally ended, the processor 121 increases the adjustment history by one. After the color registration control is executed, the processor 121 executes the printing of four sheets again and increases the execution history. If the power supply is turned off, the processor 121 increases the energization history by one.

FIG. 11 is a diagram illustrating an example of the number of counts and absence of correlations of the energization history, the execution history, and the adjustment history in the image forming device according to the first embodiment. For example, in FIG. 11, the same operation as in FIG. 10 is executed, but the image quality adjustment control and the color registration control that are executed as the performance maintenance control are abnormally ended, and the processor 121 maintains the state of the current number of counts without increasing the adjustment history. In FIG. 11, for example, the processor 121 executes the information output processing at any timing, and detects an abnormality based on a lack of correlations between the energization history and the adjustment history and between the execution history and the adjustment history. The processor 121 outputs information according to the detection result, so that the user or the like can quickly check the abnormality of a component in the device, it is not necessary to attach a sensor for each unit to determine a failure or the like, and the cost can be reduced.

Second Embodiment

Basic configurations of the image forming device 100 and the image quality maintenance control unit 117 according to a second embodiment are the same as those of the image forming device 100 and the image quality maintenance control unit 117 illustrated in FIGS. 1, 2, 3, 4, and 5 according to the first embodiment, and thus the description thereof will be omitted. The auxiliary storage device 126 according to the second embodiment stores an energization history En2, an execution history Ex2, and an adjustment history Ad2.

An overall operation executed by the image forming device 100 according to the second embodiment and a history count processing operation executed by the image forming device 100 according to the second embodiment are the same as the overall operation and the history count operation illustrated in FIGS. 7 and 8 according to the first embodiment, and thus the description thereof will be omitted.

Hereinafter, an information output operation of the image forming device 100 according to the second embodiment will be described with reference to FIG. 12. A content of the processing in the following operation description is an example, and various types of processing capable of obtaining the same result can be appropriately used.

Figure 12:
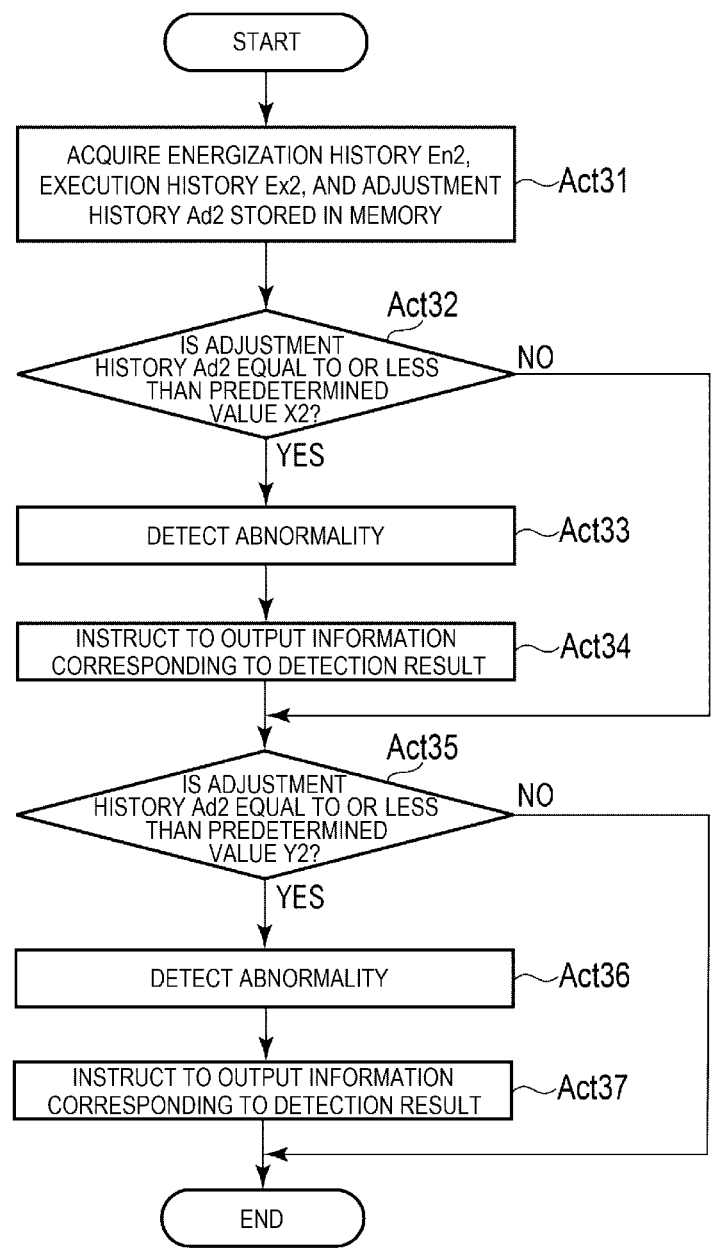
FIG. 12 is a flowchart illustrating an example of an information output processing operation executed by the image forming device according to the second embodiment.

FIG. 12 is a flowchart illustrating an example of an information output processing operation executed by the image forming device 100 according to the second embodiment. That is, FIG. 12 is a flowchart illustrating the information output processing in Act 2 illustrated in FIG. 7 in detail.

The processor 121 (the information output processing unit 1212) acquires the energization history En2, the execution history Ex2, and the adjustment history Ad2 that are stored in the auxiliary storage device 126 (Act 31). The processor 121 compares a predetermined value X2 associated with the energization history En2 with the adjustment history Ad2, and executes instructing to output information if the adjustment history Ad2 is determined to be equal to or less than the predetermined value X2. The processor 121 compares a predetermined value Y2 associated with the execution history Ex2 with the adjustment history Ad2, and executes instructing to output information if the adjustment history Ad2 is determined to be equal to or less than the predetermined value Y2.

For the predetermined value X2 associated with the energization history En2, for example, when the number of counts of the energization history En2 is 1, the performance maintenance control is determined to be executed at least once, and the number of counts of the predetermined value X2 is set to 0. For the predetermined value X2 associated with the energization history En2, for example, when the number of counts of the energization history En2 is 4, the performance maintenance control is determined to be executed at least twice, and the number of counts of the predetermined value X2 is set to 1. For the predetermined value Y2 associated with the execution history Ex2, for example, when the number of counts of the execution history Ex2 is 10, the performance maintenance control is determined to be executed at least twice, and the number of counts of the predetermined value Y2 is set to 1. For the predetermined value Y2 associated with the execution history Ex2, for example, when the number of counts of the execution history Ex2 is 100, the performance maintenance control is determined to be executed at least 11 times, and the number of counts of the predetermined value Y2 is set to 10. The predetermined value X2 and the predetermined value Y2 may be set in advance by a user or the like, or may be changed later depending on a use situation or the like.

The processor 121 compares the adjustment history Ad2 with the predetermined value X2, and if the adjustment history Ad2 is determined to be equal to or less than the predetermined value X2 (YES in Act 32), the processor 121 detects an abnormality (Act 33). After the abnormality is detected, the processor 121 executes instructing to output information according to a detection result (Act 34). For example, the control panel 116 outputs information indicating the abnormality by an image or a sound. The method for outputting the information is the same as that according to the first embodiment, and the details thereof will be omitted. The processor 121 compares the adjustment history Ad2 with the predetermined value X2, and when the adjustment history Ad2 is determined to be greater than the predetermined value X2 (No in Act 32), the processor 121 executes the next correlation determination (Act 35).

The processor 121 continues the output of the information indicating the abnormality while the adjustment history Ad2 is determined to be equal to or less than the predetermined value X2, and stops the output of the information indicating the abnormality if the adjustment history Ad2 is determined to be greater than the predetermined value X2.

Next, the processor 121 compares the adjustment history Ad2 with the predetermined value Y2, and if the adjustment history Ad2 is determined to be equal to or less than the predetermined value Y2 (Yes in Act 35), the processor 121 detects an abnormality (Act 36). After the abnormality is detected, the processor 121 executes instructing to output information according to a detection result (Act 37). For example, the control panel 116 outputs information indicating the abnormality by an image or a sound. The processor 121 compares the adjustment history Ad2 with the predetermined value Y2, and if the adjustment history Ad2 is determined to be greater than the predetermined value Y2 (NO in Act 35), the processor 121 ends the information output processing operation.

The processor 121 continues the output of the information indicating the abnormality while the adjustment history Ad2 is determined to be equal to or less than the predetermined value Y2, and stops the output of the information indicating the abnormality if the adjustment history Ad2 is determined to be greater than the predetermined value Y2.

According to the second embodiment, the following effect can be attained in addition to the effect according to the first embodiment. For example, the processor 121 can detect an abnormality or the like by comparing the adjustment history with any set predetermined value. That is, using any predetermined value set according to the use situation or the like, an abnormality can be detected according to the use situation or the like.

Third Embodiment

Basic configurations of the image forming device 100 and the image quality maintenance control unit 117 according to a third embodiment are the same as those of the image forming device 100 and the image quality maintenance control unit 117 illustrated in FIGS. 1, 2, 3, 4, and 5 according to the first embodiment, and thus the description thereof will be omitted. The auxiliary storage device 126 according to the third embodiment stores an energization history En3, an execution history Ex3, and an adjustment history Ad3.

Figure 13:
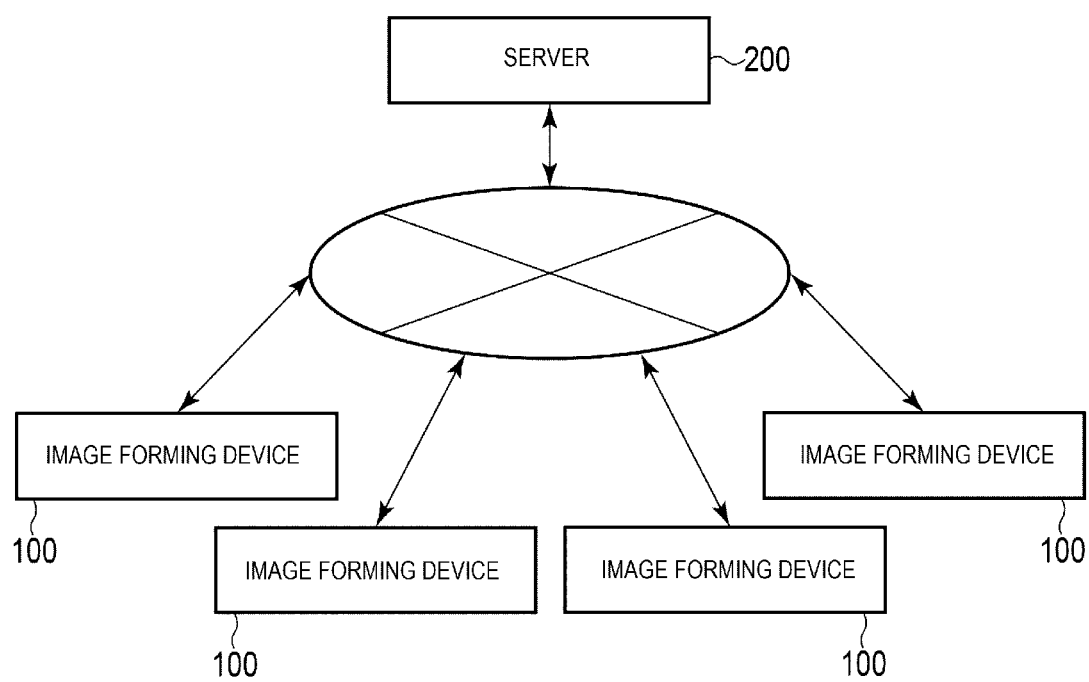
FIG. 13 is a schematic configuration diagram of an intercommunication system in the image forming device and a server according to the first embodiment to the third embodiment.

FIG. 13 is a schematic configuration diagram of an intercommunication system in the image forming device and a server according to the third embodiment. The intercommunication system includes a plurality of image forming devices 100 and the server 200. The image forming device 100 may be communicably connected to another image forming device 100 and the server 200 via a network. In FIG. 13, four image forming devices 100 are illustrated, but the present embodiment is not limited thereto.

Figure 14:
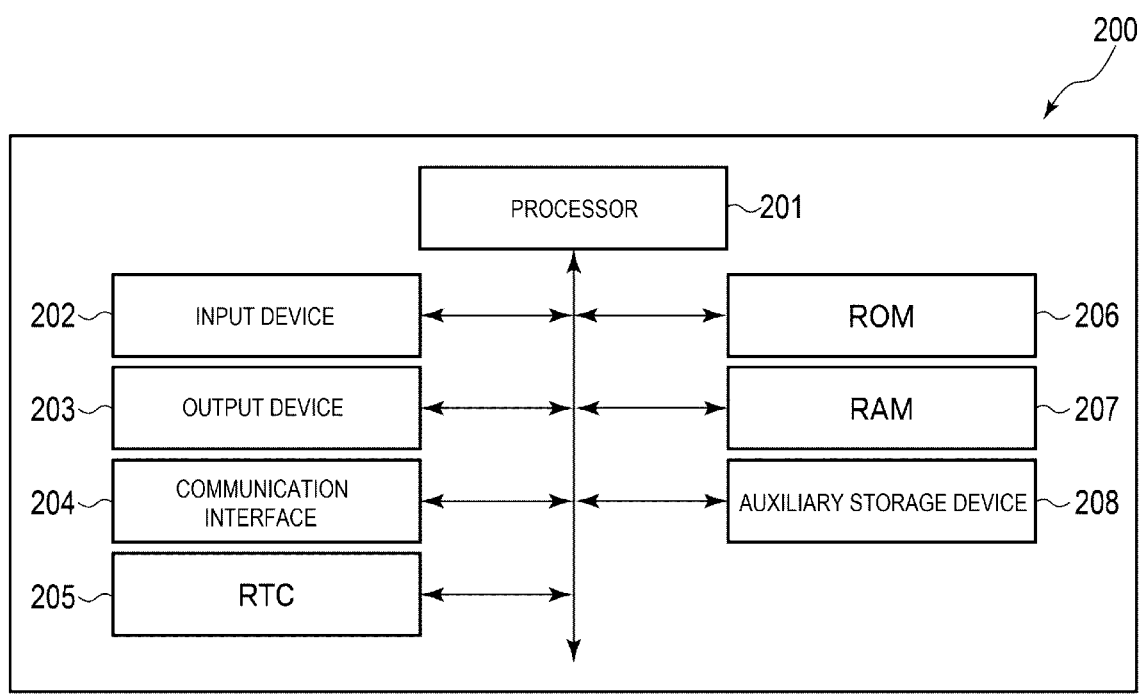
FIG. 14 is a block diagram illustrating a configuration circuit of the server.

An example of a circuit configuration of the server 200 will be described with reference to FIG. 14. FIG. 14 is a block diagram illustrating the example of a circuit configuration of the server 200 according to the third embodiment.

The server 200 includes, for example, a processor 201, a read-only memory (ROM) 206, a random-access memory (RAM) 207, an auxiliary storage device 208, a real-time clock (RTC) 205, a communication interface 204, an input device 202, and a output device 203.

The processor 201 corresponds to a central part of a computer that executes processing such as calculations and controls necessary for an operation of the server 200. The processor 201 controls each unit in order to achieve various functions of the server 200 based on a program such as system software, application software, or firmware stored in the ROM 206, the auxiliary storage device 208, or the like. The processor 201 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), or a field-programmable gate array (FPGA). Alternatively, the processor 201 may be a combination of a plurality of these devices.

The ROM 206 is a non-transitory computer readable storage medium, and corresponds to a main storage device of a computer including the processor 201 as the central part. The ROM 206 is a nonvolatile memory exclusively used for reading data. The ROM 206 stores data used when the processor 201 executes various types of processing, various set values, or the like.

The RAM 207 corresponds to the main storage device of the computer including the processor 201 as the central part. The RAM 207 is a memory used for reading and writing data. The RAM 207 is used as a so-called work area in which data is temporarily stored when the processor 201 executes various types of processing.

The auxiliary storage device 208 is a non-transitory computer readable storage medium, and corresponds to an auxiliary storage device of the computer including the processor 201 as the central part. The auxiliary storage device 208 is, for example, an electric erasable programmable read-only memory (EEPROM) (registered trademark), a hard disk drive (HDD), or a solid state drive (SSD). The auxiliary storage device 208 stores data used when the processor 201 executes various types of processing, data generated by the processing of the processor 201, various set values, or the like. The server 200 may include, instead of or in addition to the auxiliary storage device 208, an interface into which a storage medium such as a removable optical disk, a memory card, or a universal serial bus (USB) memory can be inserted. The auxiliary storage device 208 is a memory that stores various types of information.

Programs to be stored in the ROM 206 or the auxiliary storage device 208 includes a program for executing processing to be described later. As an example, the server 200 is transferred to an administrator or the like of the server 200 in a state in which the program is stored in the ROM 206 or the auxiliary storage device 208. However, the server 200 may be transferred to the administrator or the like in a state in which the program is not stored in the ROM 206 or the auxiliary storage device 208. Further, the program for executing the processing to be described later may be separately transferred to the administrator or the like, and may be written in the ROM 206 or the auxiliary storage device 208 under an operation of the administrator, a serviceman, or the like. The transfer of the program at this time can be executed by, for example, recording the program in a removable storage medium such as a magnetic disk, a magneto-optical disk, an optical disk, or a semiconductor memory, or downloading the program via a network or the like.

The communication interface 204 is an interface for the server 200 to communicate with the image forming device 100 via a network or the like.

The RTC 205 is a clock, a circuit having a built-in clock function, or the like.

The input device 202 is, for example, a device such as a microphone that receives audio data, or a device that recognizes character data input by an administrator who manages the server 200 using an input detection sheet adopting an electrostatic system or a pressure system.

The output device 203 is a display device using, for example, liquid crystal, organic EL, or the like, and displays audio, characters, images, and the like according to a signal received from the input device 202.

An overall operation executed by the image forming device 100 according to the third embodiment and a history count processing operation executed by the image forming device 100 according to the third embodiment are the same as the overall operation and the history count operation illustrated in FIGS. 7 and 8 according to the first embodiment, and thus the description thereof will be omitted.

Hereinafter, an information output operation of the image forming device 100 according to the third embodiment will be described with reference to FIG. 15. A content of the processing in the following operation description is an example, and various types of processing capable of obtaining the same result can be appropriately used.

Figure 15:
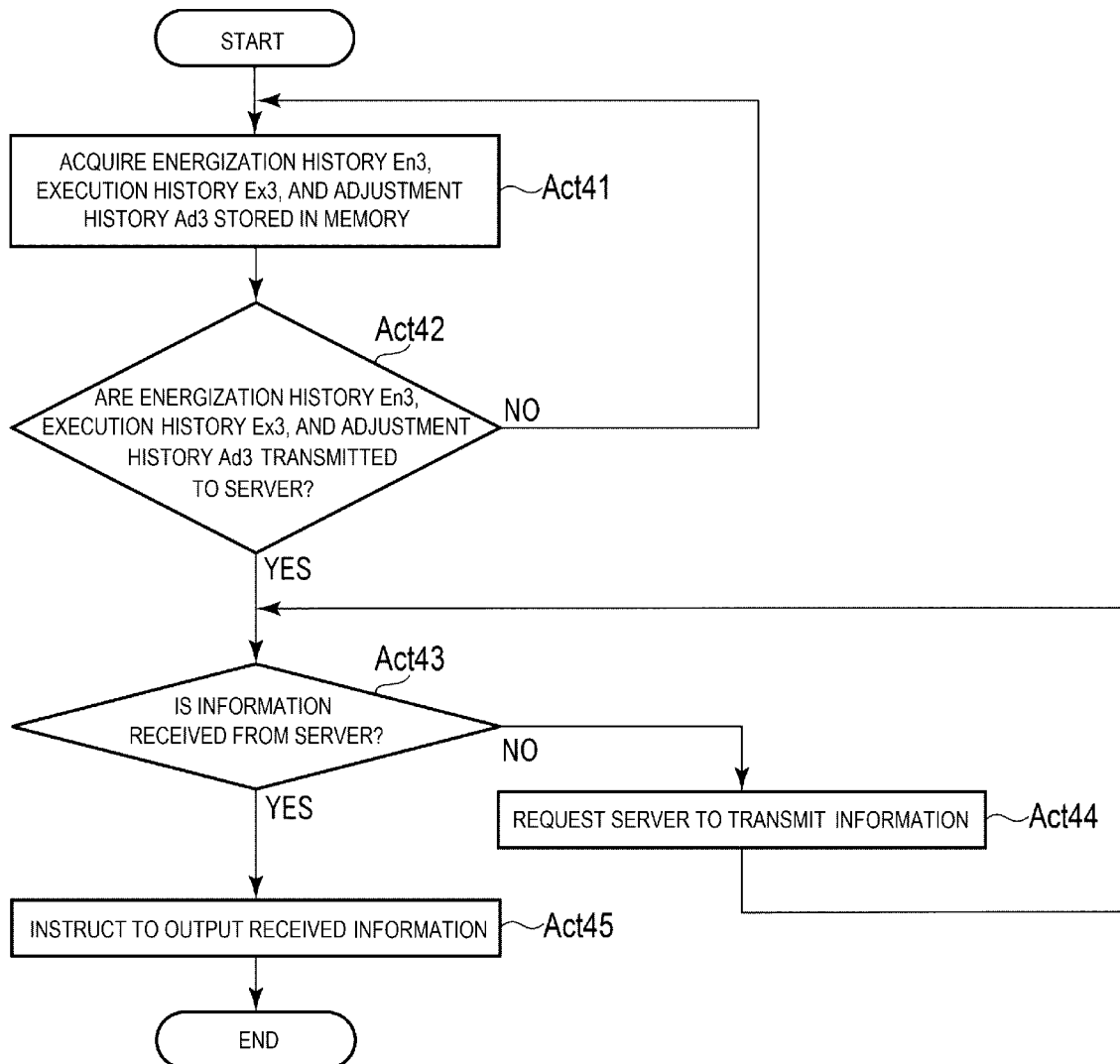
FIG. 15 is a flowchart illustrating an example of an information output processing operation executed by the image forming device according to the third embodiment.

FIG. 15 is a flowchart illustrating an example of an information output processing operation executed by the image forming device 100 according to the third embodiment. That is, FIG. 15 is a flowchart illustrating the information output processing in Act 2 illustrated in FIG. 7 in detail.

The processor 121 (the information output processing unit 1212) acquires the energization history En3, the execution history Ex3, and the adjustment history Ad3 that are stored in the auxiliary storage device 126 (Act 41). The processor 121 transmits the energization history En3, the execution history Ex3, and the adjustment history Ad3 to the server 200, and instructs the server 200 to output the received information.

The communication interface 123 transmits the energization history En3, the execution history Ex3, and the adjustment history Ad3 that are acquired as described above to the server 200 (Act 42). If the communication interface 123 transmits the energization history En3, the execution history Ex3, and the adjustment history Ad3 to the server 200 (YES in Act 42), the communication interface 123 waits for reception of the information from the server 200.

For example, a frequency at which the image forming device 100 transmits information to the server 200 via the communication interface 123 can be set to any value by a serviceman, a user, or the like, and can be set such that the information is transmitted at a designated date or at a predetermined number of times in a day.

The processor 201 acquires the energization history En3, the execution history Ex3, the adjustment history Ad3, and the like that are stored in the auxiliary storage device 126. The processor 201 analyzes the energization history En3, the execution history Ex3, and the adjustment history Ad3, and outputs an analysis result. For example, the communication interface 204 transmits the analysis result to a communication terminal assigned to the serviceman. The communication terminal receives and outputs the analysis result. The serviceman checks the analysis result via the communication terminal, and can cope with repair of a failure location or the like as necessary.

The processor 201 compares the energization history En3 with the adjustment history Ad3, or compares the execution history Ex3 with the adjustment history Ad3, and executes instructing to output information based on the correlation of the energization history En3 and the adjustment history Ad3 or the correlation of the execution history Ex3 and the adjustment history Ad3. The communication interface 204 transmits information or the like according to the correlation to the image forming device 100.

When the communication interface 123 receives the information transmitted from the server 200, the processor 121 releases a standby state (YES in ACT 43). The processor 121 periodically requests the server 200 to transmit information during the standby state (ACT 44). The request of transmitting the information may be executed when the communication interface 123 fails to receive the information, or may be executed when the communication interface 204 fails to transmit the information.

The processor 121 executes instructing to output the received information according to the correlation (Act 45). For example, the control panel 116 outputs warning information by an image or a sound. The method for outputting the information is the same as that according to the first embodiment, and the details thereof will be omitted.

According to the third embodiment, the following effect can be attained in addition to the effects according to the first embodiment and the second embodiment. By transmitting the energization history En3, the execution history Ex3, and the adjustment history Ad3, the image forming device 100 can receive information according to the energization history En3, the execution history Ex3, and the adjustment history Ad3 and can output the received information. Since the server 200 compares the energization history En3, the execution history Ex3, and the adjustment history Ad3 and determines the output of the information according to the correlations of the energization history En3, the execution history Ex3, and the adjustment history Ad3, a load on the image forming device 100 is reduced. The server 200 collectively manages the energization history En3, the execution history Ex3, the adjustment history Ad3, and the like that are transmitted from the image forming device 100, so that various defects and the like can be estimated with reference to past data of the same machine or past data of the same model. The server 200 manages the information, so that information expansion to the serviceman is also speedily executed.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming device, comprising:
   a memory configured to store an execution history of image processing and an adjustment history of the image processing; and
   a processor configured to detect an occurrence of an event based on a correlation between the execution history and the adjustment history, and to output information according to a detection result,
   wherein the memory is further configured to store an energization history,
   wherein the processor is further configured to detect an occurrence of an event based on a correlation between the energization history and the adjustment history, and
   wherein the processor is further configured to compare a predetermined value associated with the energization history with the adjustment history, and to output the information if the adjustment history is determined to be equal to or less than the predetermined value associated with the energization history.

2. The image forming device according to claim 1, wherein
the processor is further configured to detect an abnormality based on a lack of the correlation between the execution history and the adjustment history.

3. The image forming device according to claim 2, further comprising:
a user interface configured to output information indicating the abnormality.

4. The image forming device according to claim 3, wherein
the execution history includes a number of printed sheets, and
the adjustment history includes a number of execution times of a performance maintenance control.

5. The image forming device according to claim 4, wherein
the processor is further configured to execute a print control based on a print command to count the number of printed sheets, and to execute the performance maintenance control according to an increase in the number of printed sheets to count the number of execution times.

6. The image forming device according to claim 1, wherein
the processor is further configured to compare a predetermined value associated with the execution history with the adjustment history, and to output the information if the adjustment history is determined to be equal to or less than the predetermined value associated with the execution history.

7. The image forming device according to claim 1, further comprising:
a communication interface configured to transmit the execution history and the adjustment history that are stored in the memory to a server.

8. The image forming device according to claim 7, wherein
the communication interface is further configured to receive information according to a correlation between the execution history and the adjustment history that are to be transmitted from the server, and
a user interface configured to output the information to be transmitted from the server.

9. An image forming method, comprising:
storing an execution history of image processing of an image forming apparatus and an adjustment history of the image processing of the image forming apparatus in a memory;
detecting an occurrence of an event based on a correlation between the execution history and the adjustment history;
outputting information according to a detection result;
storing an energization history;
detecting an occurrence of an event based on a correlation between the energization history and the adjustment history;
comparing a predetermined value associated with the energization history with the adjustment history; and
outputting the information if the adjustment history is determined to be equal to or less than the predetermined value associated with the energization history.

10. The image forming method according to claim 9, further comprising:
detecting an abnormality based on a lack of the correlation between the execution history and the adjustment history.

11. The image forming method according to claim 10, further comprising:
outputting information indicating the abnormality.

12. The image forming method according to claim 11, wherein
the execution history includes a number of printed sheets, and
the adjustment history includes a number of execution times of a performance maintenance control.

13. The image forming method according to claim 12, further comprising:
executing a print control based on a print command to count the number of printed sheets, and
executing the performance maintenance control according to an increase in the number of printed sheets to count the number of execution times.

14. The image forming method according to claim 9, further comprising:
comparing a predetermined value associated with the execution history with the adjustment history; and
outputting the information if the adjustment history is determined to be equal to or less than the predetermined value associated with the execution history.

15. The image forming method according to claim 9, further comprising:
transmitting the execution history and the adjustment history that are stored in the memory to a server.

16. The image forming method according to claim 15, further comprising:
receiving information according to a correlation between the execution history and the adjustment history that are to be transmitted from the server; and
outputting the information to be transmitted from the server.

* * * * *